United States Patent
Soelberg

(10) Patent No.: US 11,154,771 B2
(45) Date of Patent: *Oct. 26, 2021

(54) APPARATUS AND METHOD FOR MANAGING OPERATIONS OF ACCESSORIES IN MULTI-DIMENSIONS

(71) Applicant: STEELSERIES ApS, Frederiksberg (DK)

(72) Inventor: Tino Soelberg, Chicago, IL (US)

(73) Assignee: STEELSERIES ApS, Frederiksberg (DK)

( * ) Notice: Subject to any disclaimer, the term of this patent is extended or adjusted under 35 U.S.C. 154(b) by 49 days.

This patent is subject to a terminal disclaimer.

(21) Appl. No.: 16/694,696

(22) Filed: Nov. 25, 2019

(65) Prior Publication Data
US 2020/0086210 A1 Mar. 19, 2020

Related U.S. Application Data

(63) Continuation of application No. 15/654,218, filed on Jul. 19, 2017, now Pat. No. 10,525,338, which is a
(Continued)

(51) Int. Cl.
*A63F 13/22* (2014.01)
*A63F 13/428* (2014.01)
(Continued)

(52) U.S. Cl.
CPC .......... *A63F 13/22* (2014.09); *A63F 13/211* (2014.09); *A63F 13/428* (2014.09); *G06F 3/017* (2013.01);
(Continued)

(58) Field of Classification Search
CPC ...... A63F 13/22; A63F 13/211; A63F 13/428; G06F 3/017; G06F 3/023; G06F 3/0346
See application file for complete search history.

(56) References Cited

U.S. PATENT DOCUMENTS 5,207,426 A 5/1993 Inoue et al.
5,643,087 A 7/1997 Marcus et al.
(Continued)

FOREIGN PATENT DOCUMENTS

DE 102010030974 A1 3/2011
GB 2434228 7/2007
(Continued)

OTHER PUBLICATIONS

Ideazon Merc Stealth Illuminated Gaming Keyboard Review, Jan. 31, 2008. Available on the internet in Feb. 2009 under the URL https://web.archive.org/web/20090210152018/http://overclockersclub.com/reviews/ideazon_merc_stealth_illuminated_gaming_keyboard, pp. 1-5.
(Continued)

*Primary Examiner* — Reginald A Renwick
(74) *Attorney, Agent, or Firm* — Guntin & Gust, PLC; Matthew Bruce Tropper

(57) ABSTRACT

A system that incorporates teachings of the present disclosure may include, for example, a method for presenting in a graphical user interface a plurality of associable three-dimensional (3D) actions and a plurality of accessories having distinct operational functions, receiving a request to associate one of the plurality of 3D associable actions with an input function of a select one of the plurality of accessories, associating the 3D action with the input function of the selected accessory, monitoring the selected accessory for a stimulation of the input function, and transmitting the 3D action responsive to detecting the stimulation of the input function. Additional embodiments are disclosed.

20 Claims, 10 Drawing Sheets

Related U.S. Application Data continuation of application No. 13/099,609, filed on May 3, 2011, now Pat. No. 9,737,796, which is a continuation-in-part of application No. 12/499,670, filed on Jul. 8, 2009, now Pat. No. 8,719,714.

(51) Int. Cl.

| | | |
|---|---|---|
| *A63F 13/211* | (2014.01) | |
| *G06F 3/01* | (2006.01) | |
| *G06F 3/023* | (2006.01) | |
| *G06F 3/0346* | (2013.01) | |
| *G06F 3/038* | (2013.01) | |
| *G06F 3/0484* | (2013.01) | |

(52) U.S. Cl.
CPC .............. *G06F 3/023* (2013.01); *G06F 3/038* (2013.01); *G06F 3/0346* (2013.01); *G06F 3/04847* (2013.01); *A63F 2300/1018* (2013.01); *A63F 2300/308* (2013.01)

(56) References Cited

U.S. PATENT DOCUMENTS

| | | |
|---|---|---|
| D387,094 S | 12/1997 | Muraki et al. |
| 5,785,317 A | 7/1998 | Sasaki |
| D411,839 S | 7/1999 | Au Yeung |
| 5,923,317 A | 7/1999 | Sayler et al. |
| 6,071,194 A | 6/2000 | Sanderson |
| 6,348,911 B1 | 2/2002 | Rosenberg et al. |
| D487,466 S | 3/2004 | Yokota |
| 6,743,100 B1 | 6/2004 | Neiser |
| 6,932,341 B1 | 8/2005 | Kenyon |
| 7,002,702 B1 | 2/2006 | Machida |
| D568,883 S | 5/2008 | Ashida et al. |
| D570,349 S | 6/2008 | Ashida et al. |
| 7,383,327 B1 | 6/2008 | Tormasov |
| D585,931 S | 2/2009 | Palmer |
| 8,063,893 B2 | 11/2011 | Rosenberg et al. |
| 8,143,982 B1 | 3/2012 | Lauder et al. |
| 8,212,772 B2 | 7/2012 | Shahoian |
| 8,264,310 B2 | 9/2012 | Ive et al. |
| 8,264,465 B2 | 9/2012 | Grant et al. |
| 8,313,379 B2 | 11/2012 | Ikeda et al. |
| 8,378,979 B2 | 2/2013 | Frid et al. |
| 8,418,085 B2 | 4/2013 | Snook et al. |
| 8,436,821 B1 | 5/2013 | Plichta et al. |
| D697,140 S | 1/2014 | Baum |
| 8,638,190 B1 | 1/2014 | Want et al. |
| 8,660,342 B2 | 2/2014 | Obrador et al. |
| 8,867,013 B2 | 10/2014 | Krishnakumar et al. |
| 8,913,021 B2 | 12/2014 | Hotelling et al. |
| 9,409,087 B2 | 8/2016 | Soelberg, III et al. |
| 9,737,796 B2 | 8/2017 | Soelberg |
| 10,525,338 B2 * | 1/2020 | Soelberg ............... A63F 13/213 |
| 2001/0003713 A1 | 6/2001 | Willner et al. |
| 2001/0011995 A1 | 8/2001 | Hinckley et al. |
| 2002/0052230 A1 | 5/2002 | Martinek et al. |
| 2003/0063779 A1 | 4/2003 | Wrigley |
| 2003/0220142 A1 | 11/2003 | Siegel et al. |
| 2004/0166940 A1 | 8/2004 | Rothschild |
| 2004/0193441 A1 | 9/2004 | Altieri |
| 2004/0219976 A1 | 11/2004 | Campbell et al. |
| 2004/0229687 A1 | 11/2004 | Miyamoto et al. |
| 2004/0261026 A1 | 12/2004 | Corson |
| 2005/0035945 A1 | 2/2005 | Keenan et al. |
| 2005/0183143 A1 | 8/2005 | Anderholm et al. |
| 2005/0210417 A1 | 9/2005 | Marvit et al. |
| 2005/0225530 A1 | 10/2005 | Evans et al. |
| 2005/0239523 A1 | 10/2005 | Longman et al. |
| 2006/0119586 A1 | 6/2006 | Grant et al. |
| 2006/0121990 A1 | 6/2006 | O'Kelley et al. |
| 2006/0148578 A1 | 7/2006 | Hayes et al. |
| 2006/0152489 A1* | 7/2006 | Sweetser ............... G06F 3/0325 345/158 |
| 2006/0152495 A1 | 7/2006 | Gombert et al. |
| 2006/0178212 A1* | 8/2006 | Penzias ................... A63F 13/06 463/37 |
| 2006/0190270 A1 | 8/2006 | Luisi |
| 2006/0211471 A1 | 9/2006 | Walker et al. |
| 2006/0211494 A1 | 9/2006 | Helfer et al. |
| 2006/0246969 A1 | 11/2006 | Penello et al. |
| 2006/0258464 A1 | 11/2006 | Kawanobe et al. |
| 2007/0026935 A1 | 2/2007 | Wolf et al. |
| 2007/0080934 A1 | 4/2007 | Chen et al. |
| 2007/0149288 A1 | 6/2007 | Nickell et al. |
| 2007/0218965 A1 | 9/2007 | Tilston et al. |
| 2007/0259716 A1 | 11/2007 | Mattice et al. |
| 2008/0174550 A1 | 7/2008 | Laurila et al. |
| 2008/0214305 A1 | 9/2008 | Addington et al. |
| 2008/0221885 A1 | 9/2008 | Lin |
| 2008/0225041 A1 | 9/2008 | El Dokor et al. |
| 2009/0054146 A1 | 2/2009 | Epstein et al. |
| 2009/0085877 A1 | 4/2009 | Chang et al. |
| 2009/0124387 A1 | 5/2009 | Perlman et al. |
| 2009/0144621 A1 | 6/2009 | Sangster et al. |
| 2009/0144624 A1 | 6/2009 | Barnes |
| 2009/0163272 A1 | 6/2009 | Baker et al. |
| 2009/0183098 A1 | 7/2009 | Casparian et al. |
| 2009/0189858 A1 | 7/2009 | Lev et al. |
| 2009/0303204 A1 | 12/2009 | Nasiri et al. |
| 2009/0320055 A1 | 12/2009 | Langille et al. |
| 2010/0081505 A1 | 4/2010 | Alten et al. |
| 2010/0113153 A1 | 5/2010 | Yen et al. |
| 2010/0179856 A1 | 7/2010 | Paretti et al. |
| 2011/0007021 A1 | 1/2011 | Bernstein et al. |
| 2011/0014984 A1 | 1/2011 | Penman et al. |
| 2011/0021272 A1 | 1/2011 | Grant et al. |
| 2011/0034248 A1 | 2/2011 | Grever et al. |
| 2011/0045912 A1 | 2/2011 | Bortnick |
| 2011/0065509 A1 | 3/2011 | Rom et al. |
| 2011/0081969 A1 | 4/2011 | Ikeda et al. |
| 2011/0086706 A1* | 4/2011 | Zalewski ............... A63F 13/335 463/36 |
| 2011/0191686 A1 | 8/2011 | Wolff-Petersen et al. |
| 2011/0250967 A1 | 10/2011 | Kulas et al. |
| 2012/0050180 A1 | 3/2012 | King et al. |
| 2012/0071244 A1 | 3/2012 | Gillo et al. |
| 2012/0071248 A1 | 3/2012 | Hovseth |
| 2012/0155705 A1 | 6/2012 | Latta et al. |
| 2012/0223935 A1 | 9/2012 | Renwick et al. |
| 2012/0313901 A1 | 12/2012 | Monson et al. |
| 2012/0319989 A1 | 12/2012 | Argiro et al. |
| 2012/0323521 A1 | 12/2012 | De Foras et al. |
| 2013/0016042 A1 | 1/2013 | Makinen et al. |
| 2013/0055162 A1 | 2/2013 | Arriola et al. |
| 2013/0057299 A1 | 3/2013 | Unterreitmayer et al. |
| 2013/0077820 A1 | 3/2013 | Marais et al. |
| 2013/0090930 A1 | 4/2013 | Monson et al. |
| 2013/0188866 A1 | 7/2013 | Obrador et al. |
| 2013/0196757 A1 | 8/2013 | Latta et al. |
| 2013/0242505 A1 | 9/2013 | Mak et al. |
| 2013/0273986 A1 | 10/2013 | Arnone et al. |
| 2013/0303281 A1 | 11/2013 | Argiro et al. |
| 2014/0129935 A1 | 5/2014 | Ovadia Nahon et al. |
| 2014/0168100 A1 | 6/2014 | Argiro et al. |
| 2014/0357372 A1 | 12/2014 | Garcia |
| 2015/0089262 A1 | 3/2015 | Cairns |
| 2016/0317923 A1 | 11/2016 | Wikel |
| 2016/0332072 A1 | 11/2016 | Mahlmeister et al. |
| 2017/0083194 A1 | 3/2017 | Aronzon et al. |
| 2017/0151498 A1 | 6/2017 | Soelberg |
| 2017/0189807 A1 | 7/2017 | Mahlmeister et al. |
| 2017/0259175 A1 | 9/2017 | Mahlmeister et al. |
| 2017/0319952 A1 | 11/2017 | Soelberg |
| 2018/0345142 A1 | 12/2018 | Mahlmeister et al. |
| 2019/0046877 A1 | 2/2019 | Mahlmeister et al. |
| 2019/0250777 A1 | 8/2019 | Aronzon |
| 2021/0089176 A1 | 3/2021 | Aronzon et al. |

FOREIGN PATENT DOCUMENTS

| | | |
|---|---|---|
| WO | 2006107296 | 10/2006 |
| WO | 2011130755 | 10/2011 |

(56) References Cited

FOREIGN PATENT DOCUMENTS

OTHER PUBLICATIONS

"Battlefield 1942", published by EA Games in Sep. 2002 as evidenced by Battlefield 1942 Wikipedia article printed on Sep. 18, 2017, pp. 1-7.
"ControllerMate v4.6", OrderedBytes, 2012, 1 page.
"GestIC Technology Design Center", [http://www.microchip.com/pagehandler/en_us/technology/gestic, Apr. 29, 2013, 1 page.
"GestIC Technology Design Center", [http://www.microchip.com/pagehandler/en-us/technology/gestic/gettingstarted.html], Apr. 29, 2013, 1 page.
"Leap Motion", [https://www.leapmotion.com/], Apr. 29, 2013, 6 pages.
"Near and Far Field", [http://en.wikipedia.org/wiki/Near_and_far_field], Wikipedia, May 2, 2013, 10 pages.
"Siri. Your Wish is its command.", http://www.apple.com/ios/siri/, Apr. 24, 2013, pp. 1-3.
Microsoft, "Xbox 360 Limited Edition Metallic Silver Wireless Controller", http://www.microsoftstore.com/store/msstore/en_US/pd/ThemeID.27509700/Xbox-360-Limited-Edition-Metallic-Silver-Wireless-Controller/productID.246602800, Mar. 19, 2013, pp. 1-2.
Osoinach, B., ""Proximity Capacitive Sensor Technology for Touch Sensing Applications,"", Freescale Semiconductor, Tempe, AZ, 2008, pp. 1-12.
Sony, "PS3 DualShock 3 Wireless Controller", http://www.gamestop.com/ps3/accessories/ps3-dualshock-3-wireless-controller/69638; Mar. 19, 2013, pp. 1-6.

* cited by examiner

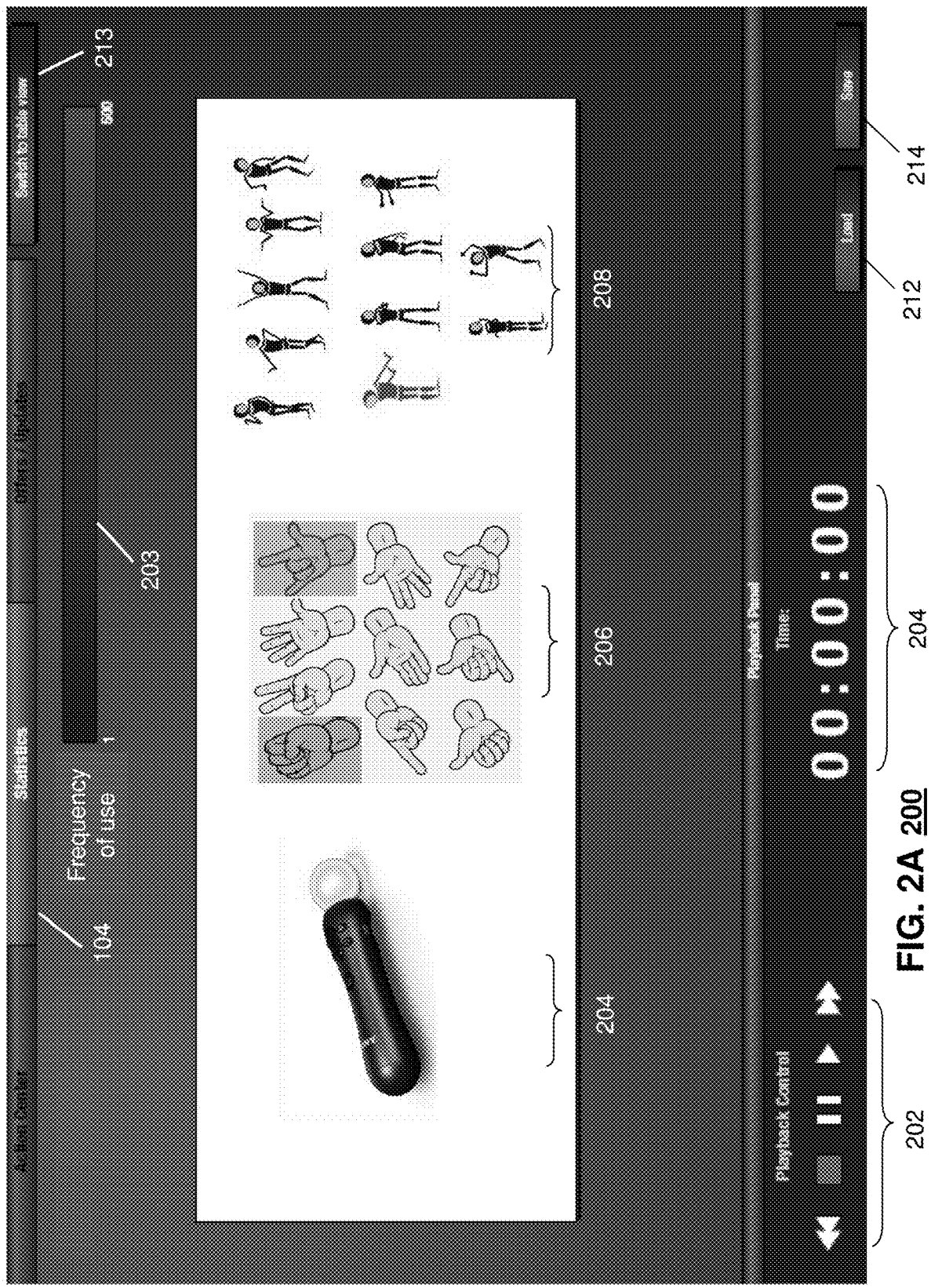

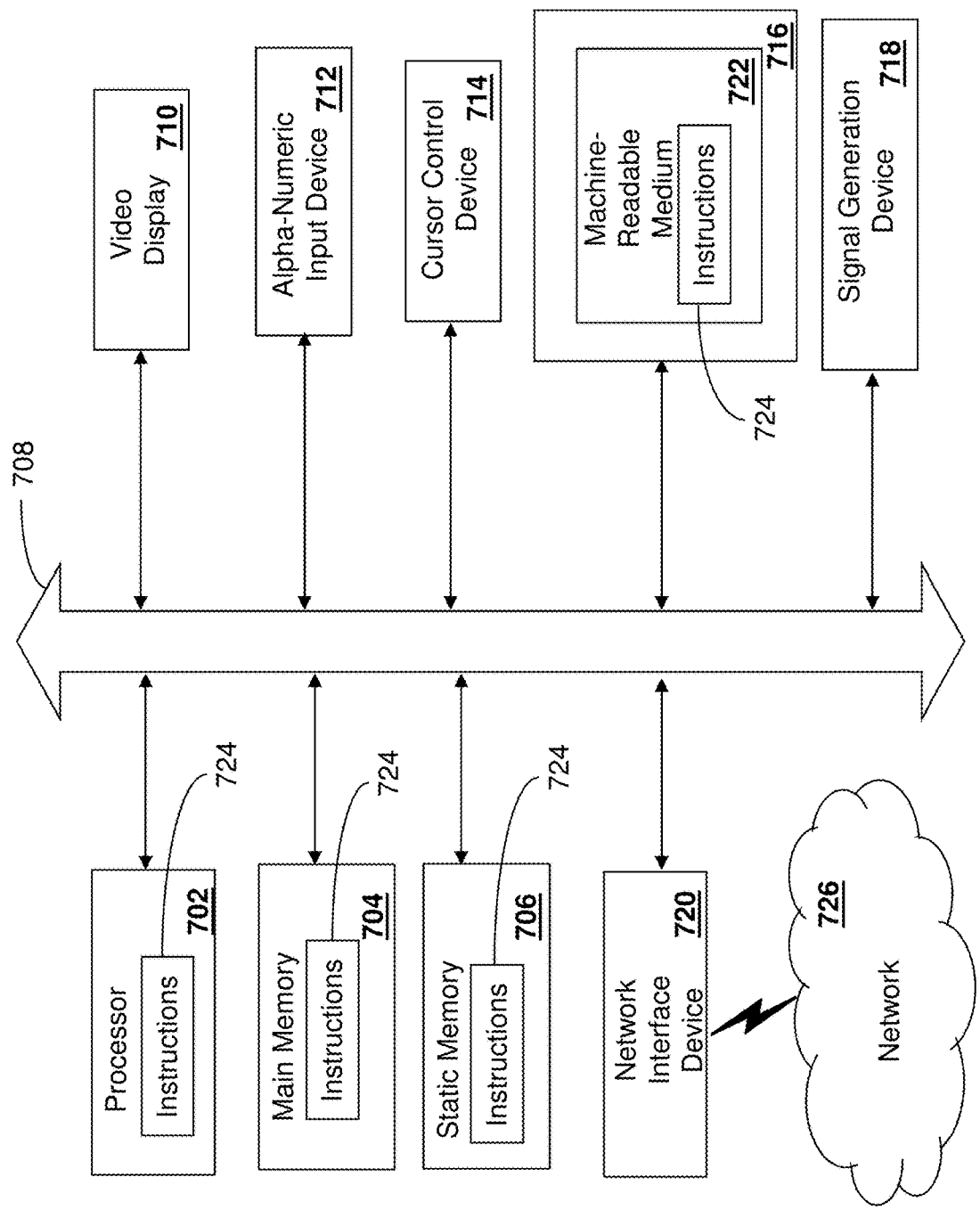

APPARATUS AND METHOD FOR MANAGING OPERATIONS OF ACCESSORIES IN MULTI-DIMENSIONS

CROSS REFERENCE TO RELATED APPLICATIONS

This application is a continuation of U.S. patent application Ser. No. 15/654,218, filed on Jul. 19, 2017, which is a continuation of U.S. patent application Ser. No. 13/099,609 (now U.S. Pat. No. 9,737,796), filed on May 3, 2011, which is a continuation-in-part of U.S. patent application Ser. No. 12/499,670 (now U.S. Pat. No. 8,719,714), filed on Jul. 8, 2009. All sections of the aforementioned application(s) and patent(s) are incorporated herein by reference in their entirety.

FIELD OF THE DISCLOSURE

The present disclosure relates generally to accessory management applications, and more specifically to an apparatus and method for managing operations of accessories in multi-dimensions.

BACKGROUND

It is common today for garners to utilize more than one gaming accessory. This is especially true of garners who play Massively Multiplayer On-line (MMO) games in a team or individual configuration. Garners can have at their disposal accessories such as a keyboard, a general purpose gaming pad, a mouse, a gaming console controller, a headset with a built-in microphone to communicate with other players, a joystick, a computer display, or other common gaming accessories.

A gamer can frequently use a combination of these accessories in one game. Efficient management and utilization of these accessories can frequently impact a gamer's ability to compete.

Accessory management can have utility in other disciplines which may not relate to gaming applications. Efficient use of accessories in these other disciplines can be important to users.

BRIEF DESCRIPTION OF THE DRAWINGS

FIGS. 1A-1B and 2A-2B depict illustrative embodiments of a Graphical User Interface (GUI) generated by a application operating according to the methods of FIGS. 4-6;

FIG. 7 depicts an illustrative diagrammatic representation of a machine in the form of a computer system within which a set of instructions, when executed, may cause the machine to perform any one or more of the methodologies disclosed herein.

DETAILED DESCRIPTION

One embodiment of the present disclosure includes a non-transitory computer-readable storage medium having computer instructions to obtain three-dimensional (3D) recorded stimuli generated by a 3D gaming accessory, to characterize the 3D recorded stimuli as a 3D associable action, to present in a graphical user interface the 3D associable action in a graphically identifiable form and a plurality of gaming accessories having distinct operational functions, to detect an association of the 3D associable action with an input function of a select one of the plurality of gaming accessories, to associate the 3D recorded stimuli with the input function of the selected gaming accessory, to detect a stimulation of the input function while monitoring the selected gaming accessory in use, to retrieve the 3D recorded stimuli responsive to the detected stimulation of the input function, and to transmit the 3D recorded stimuli destined for a software gaming application to control a 3D aspect of a presentation generated by the software gaming application.

One embodiment of the present disclosure includes a method for presenting in a graphical user interface a plurality of associable three-dimensional (3D) actions and a plurality of accessories having distinct operational functions, receiving a request to associate one of the plurality of 3D associable actions with an input function of a select one of the plurality of accessories, associating the 3D action with the input function of the selected accessory, monitoring the selected accessory for a stimulation of the input function, and transmitting the 3D action responsive to detecting the stimulation of the input function.

One embodiment of the present disclosure entails a computing device having a controller to present a plurality of associable three-dimensional (3D) actions and a plurality of accessories of distinct operational function, to associate a 3D action with an input function of a select one of the plurality of accessories, to monitor the selected accessory for a stimulation of the input function, and to transmit the 3D action or an aspect thereof to a software application responsive to detecting the stimulation of the input function.

Figure 2B:
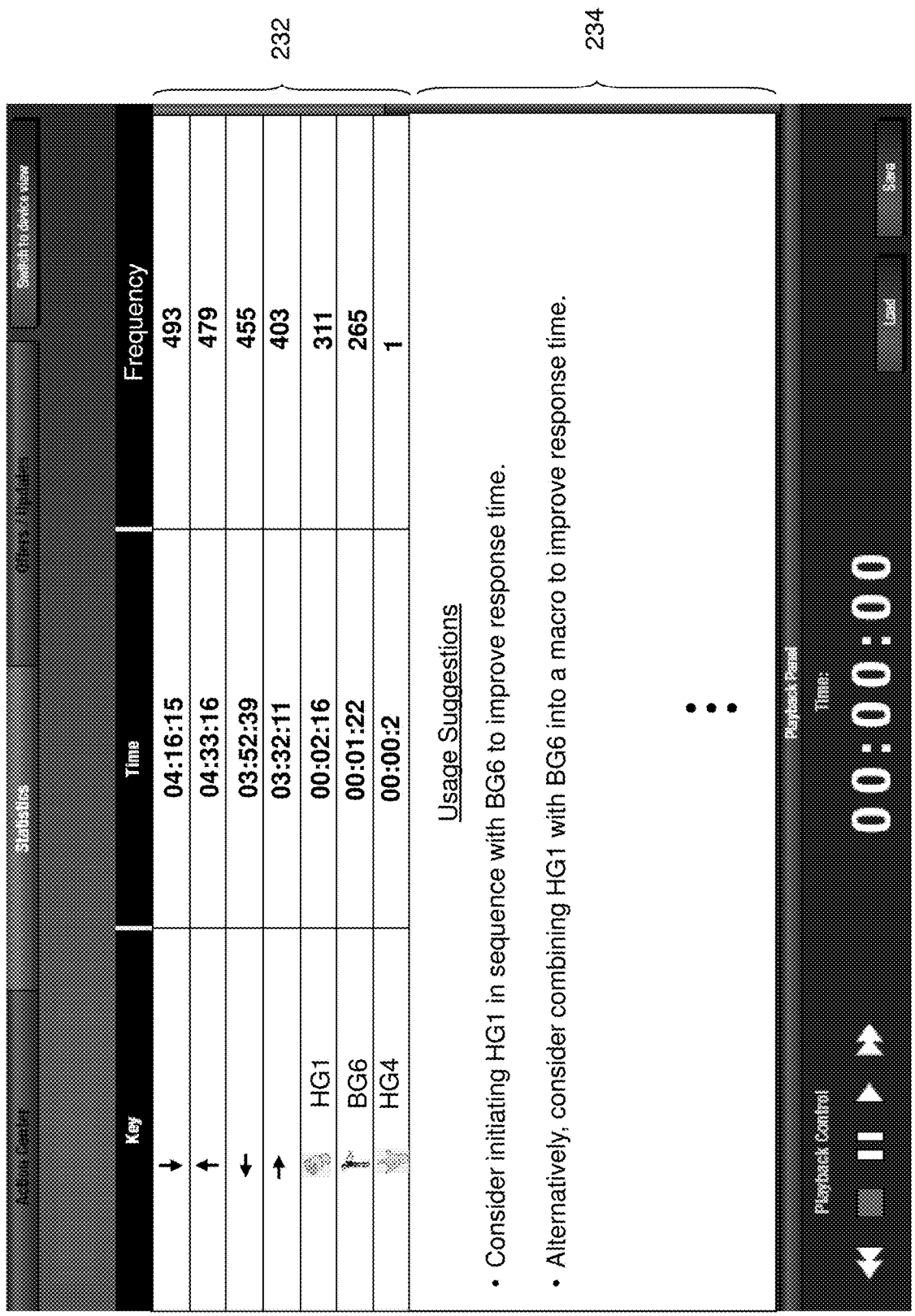
Figure 3:
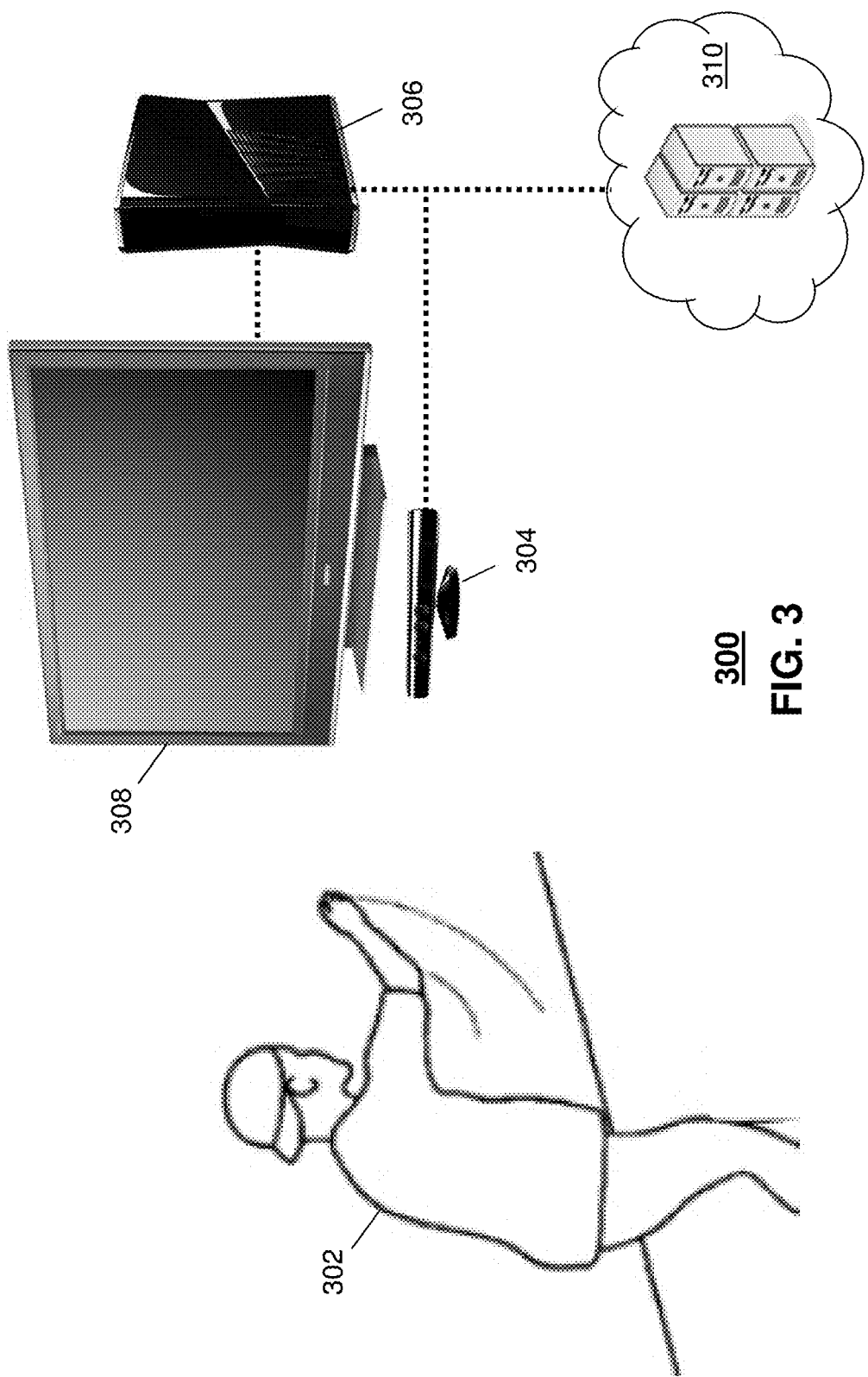
FIG. 3 depicts an illustrative embodiment of a system operating according to the methods of FIGS. 4-5 and 6A-6B.
Figure 4:
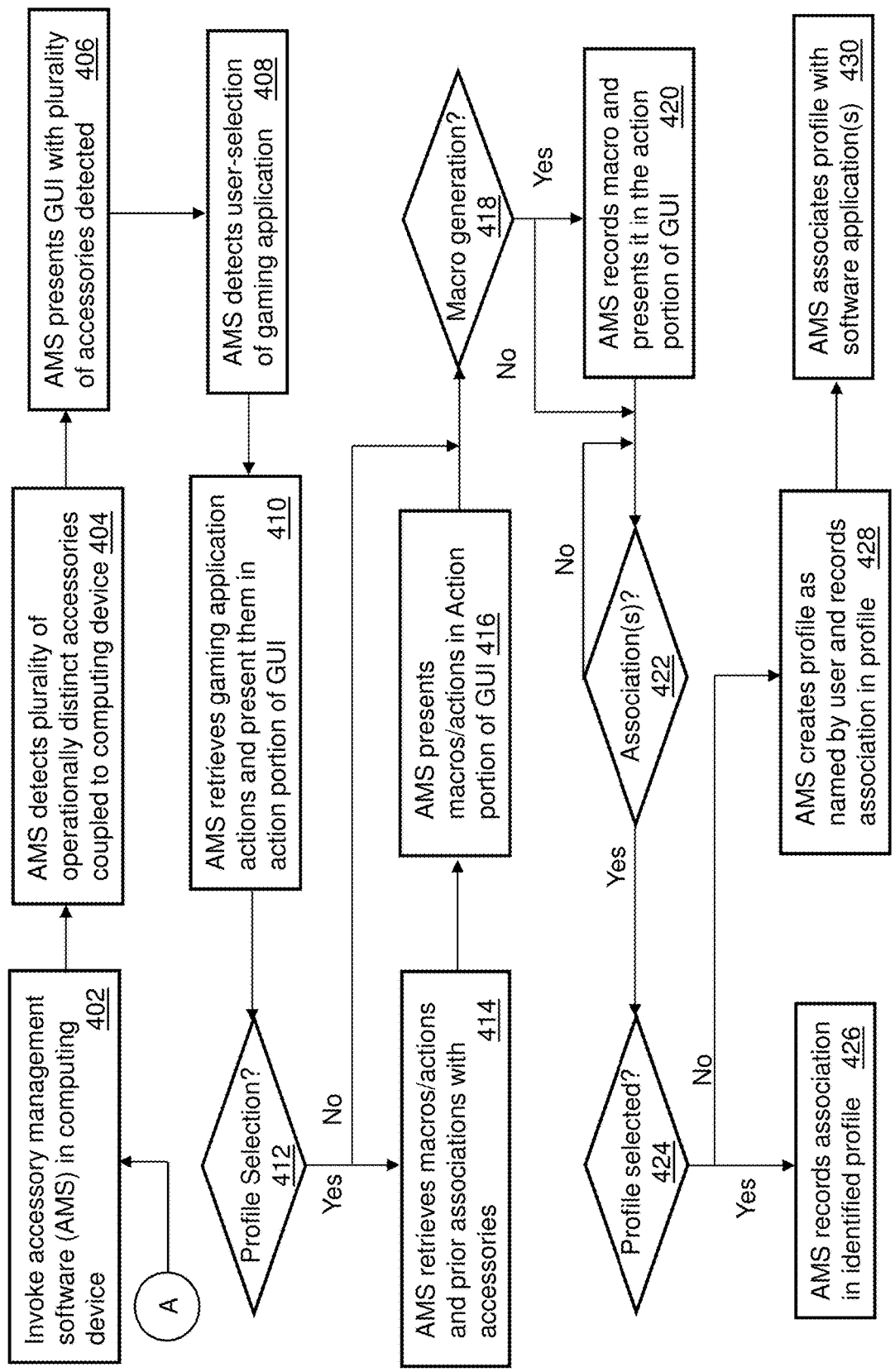
FIGS. 4-5 and 6A-6B depict illustrative methods according to the present disclosure.
Figure 5:
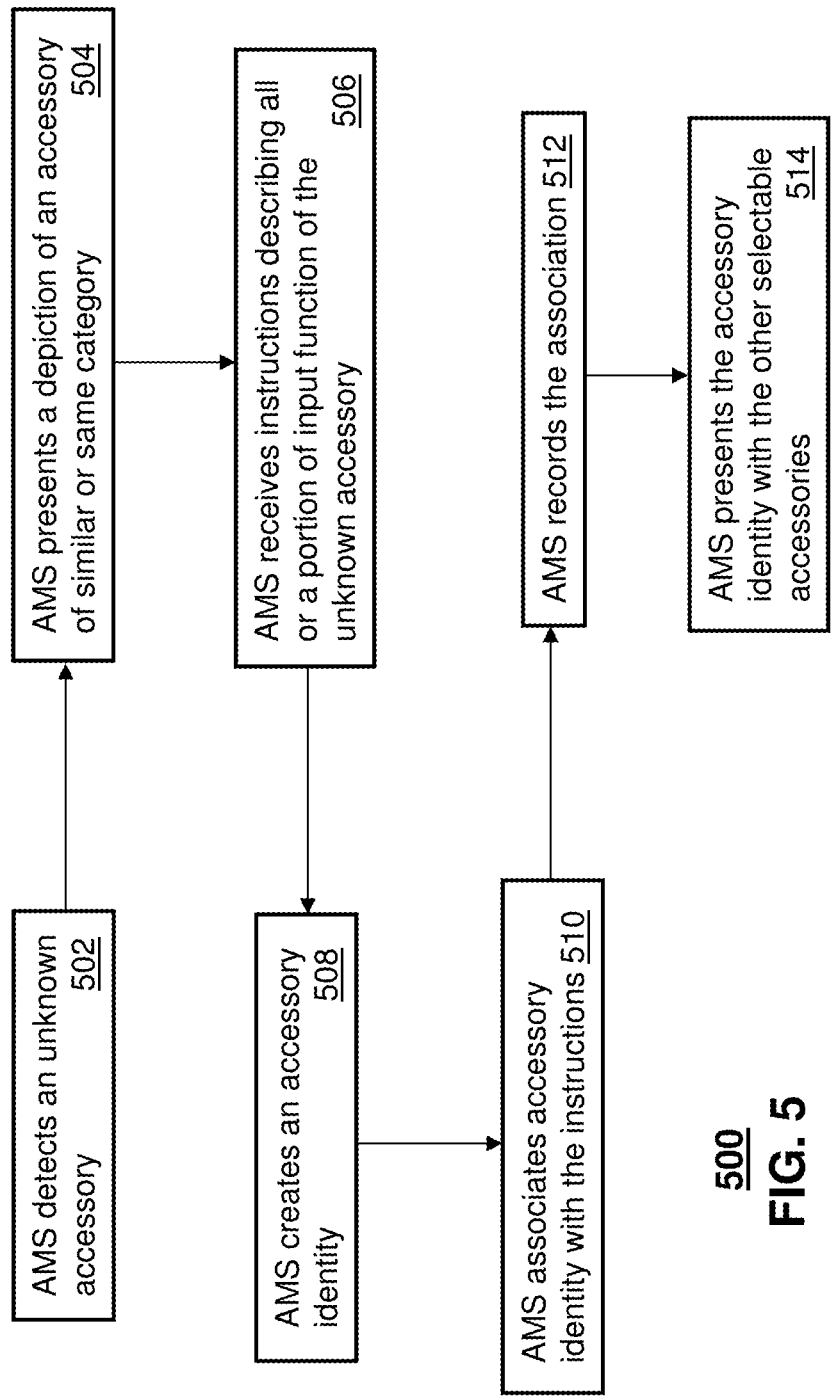
Figure 6A:
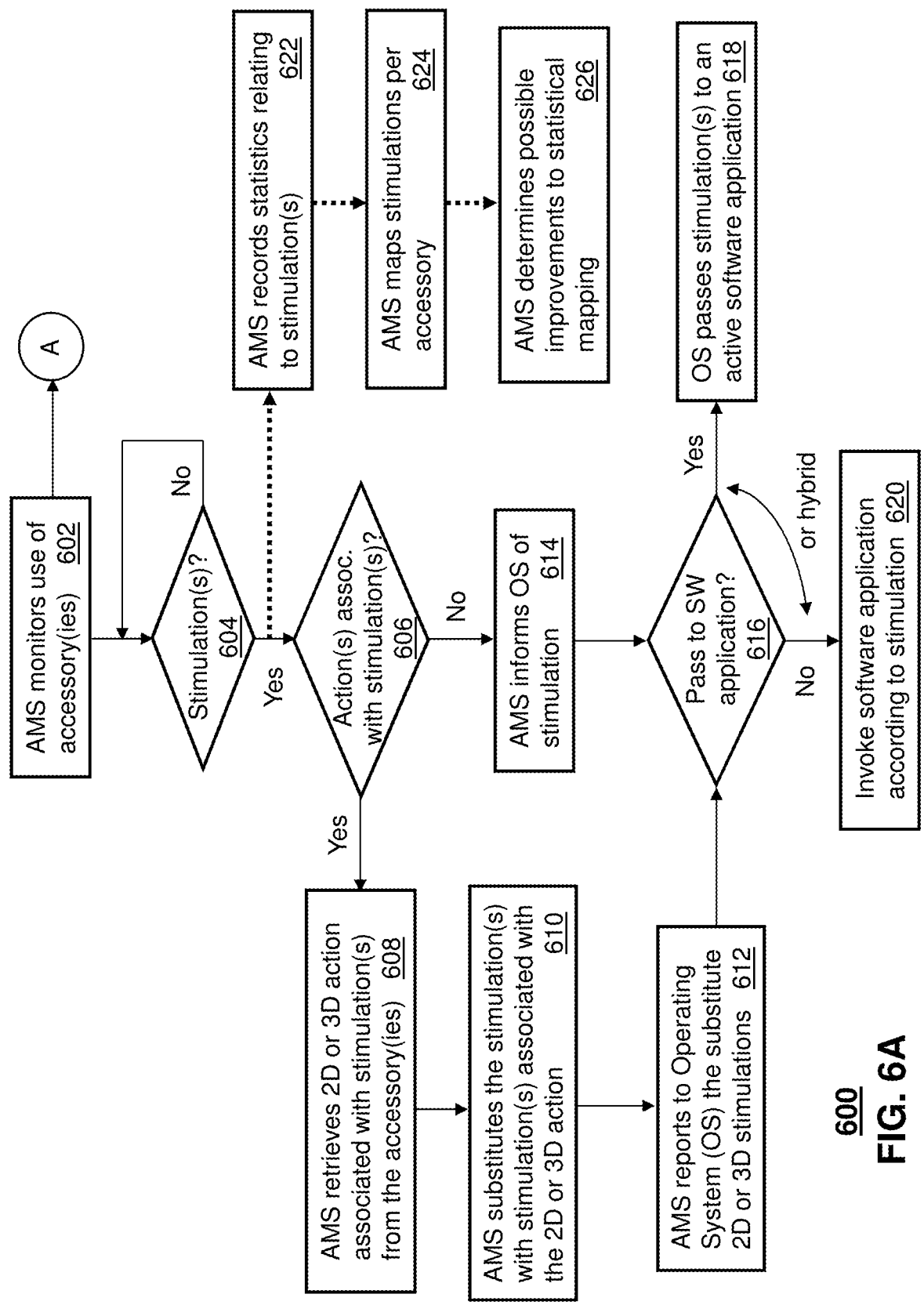

FIGS. 1-3 depict illustrative embodiments of a Graphical User Interface (GUI) generated by an accessory management software (AMS) application operating according to the methods of FIGS. 4-6. The AMS application can operate in a computing device such as a desktop computer, a laptop computer, a server for online or cloud computing operations, a mainframe computer, or a gaming console. A gaming console can represent a gaming device such as a Playstation 3™, a Wii™, or an Xbox360™. Other present and next generation gaming consoles are contemplated. The AMS application can also operate in other computing devices with less computing resources such as a cellular phone, a personal digital assistant, or a media player (such as an iPOD™). From these illustrations it would be apparent to an artisan with ordinary skill in the art that the software application can operate in any device with computing resources.

FIGS. 4-6 depict illustrative methods 400-600 describing the operation of the AMS application in the context of the system of FIG. 3. FIG. 3 depicts an image sensor 304 for capturing 3D images of a gamer 302, a gaming console 306 and a presentation device 308 such as a television set. The image sensor 304 can be communicatively coupled to the gaming console 306 by cable or a wireless medium such as wireless fidelity (WiFi), Bluetooth, or other suitable wireless protocols. The image sensor 304 can include computing resources and imaging resources to capture and process two-dimensional (2D) or three-dimensional (3D) images. The image sensor 304 can process and convert images to gaming stimuli which can be transmitted to the gaming console 306 for controlling a video game.

Alternatively, the image sensor 304 can transmit the 2D or 3D captured images to the gaming console 306 for processing said images into gaming stimuli. The gaming console 306 can include storage, computing, and presentation resources to process images captured by the image sensor 304 into gaming stimuli for controlling a video game presented on the presentation device 308, which is coupled to the gaming console 306 by wired (e.g., HDMI, coax cable, composite video, etc.) or wireless means. The AMS application that produces the GUI images of FIGS. 1-2 referred to earlier can operate from the image sensor 304, the gaming console 306, or a remote server 310 that processes 2D or 3D game stimuli for on-line games where a gaming console is not used or available.

Figure 1A:

With this in mind, method 400 can begin with step 402 in which a Graphical User Interface (GUI) generated by an accessory management software (AMS) application can be invoked by the gamer 302. The AMS application can operate in whole or in part from the image sensor 304, the gaming console 306, the remote server 310, or combinations thereof ("device(s)"). The invocation step can result from a user selection of the AMS application from a menu or iconic symbol presented on the television 308 by the gaming console 306 using a gaming controller 115 such as shown in FIG. 1A, a selection of a specialized button on the gaming controller 115, a speech command detected by a microphone of the gaming console 306 or coupled thereto, or other suitable means for launching a software application. In step 404, the AMS application can detect a plurality of operationally distinct accessories communicatively coupled to the device(s) from which the AMS application operates. The accessories can be coupled to the device by a tethered interface (e.g., USB cable), a wireless interface (e.g., Bluetooth or Wireless Fidelity-WiFi), or combinations thereof.

In the present context, an accessory can represent any type of device which can be communicatively coupled to the device from which the AMS application operates and which can control aspects of the operating system (OS) and/or a software application operating in the device or in a remote computing system such as a server. An accessory can represent for example a keyboard, a gaming pad, a mouse, a gaming console controller, a joystick, a microphone, a headset with a microphone, a wand (such as shown in FIG. 1A), the image sensor 304 of FIG. 3, or actions of the gamer 302 such as 2D or 3D body or facial actions, gestures, or body language-just to mention a few.

The keyboard and gaming pad represent accessories of a similar category since their operational parameters are alike. A mouse and a wand, on the other hand, represents an accessory having disparate operational parameters from the keyboard or gaming pad. For instance, the operational parameters of a keyboard generally consist of alphanumeric keys, control keys (e.g., Shift, Alt, Ctrl), and function keys while the operational parameters of a mouse and wand consist of navigation data generated by a tracking device such as a laser sensor, accelerometers or gyros, buttons to invoke GUI selections, and settings thereof (e.g., counts or dots per inch, acceleration, scroll speed, jitter control, line straightening control, and so on). Such distinctions can be used to identify disparate categories of accessories. The joysticks, game controllers, images sensor 304, a gamer 302 and other sources of stimuli represent additional categories of accessories supported by the AMS application.

Figure 1B:
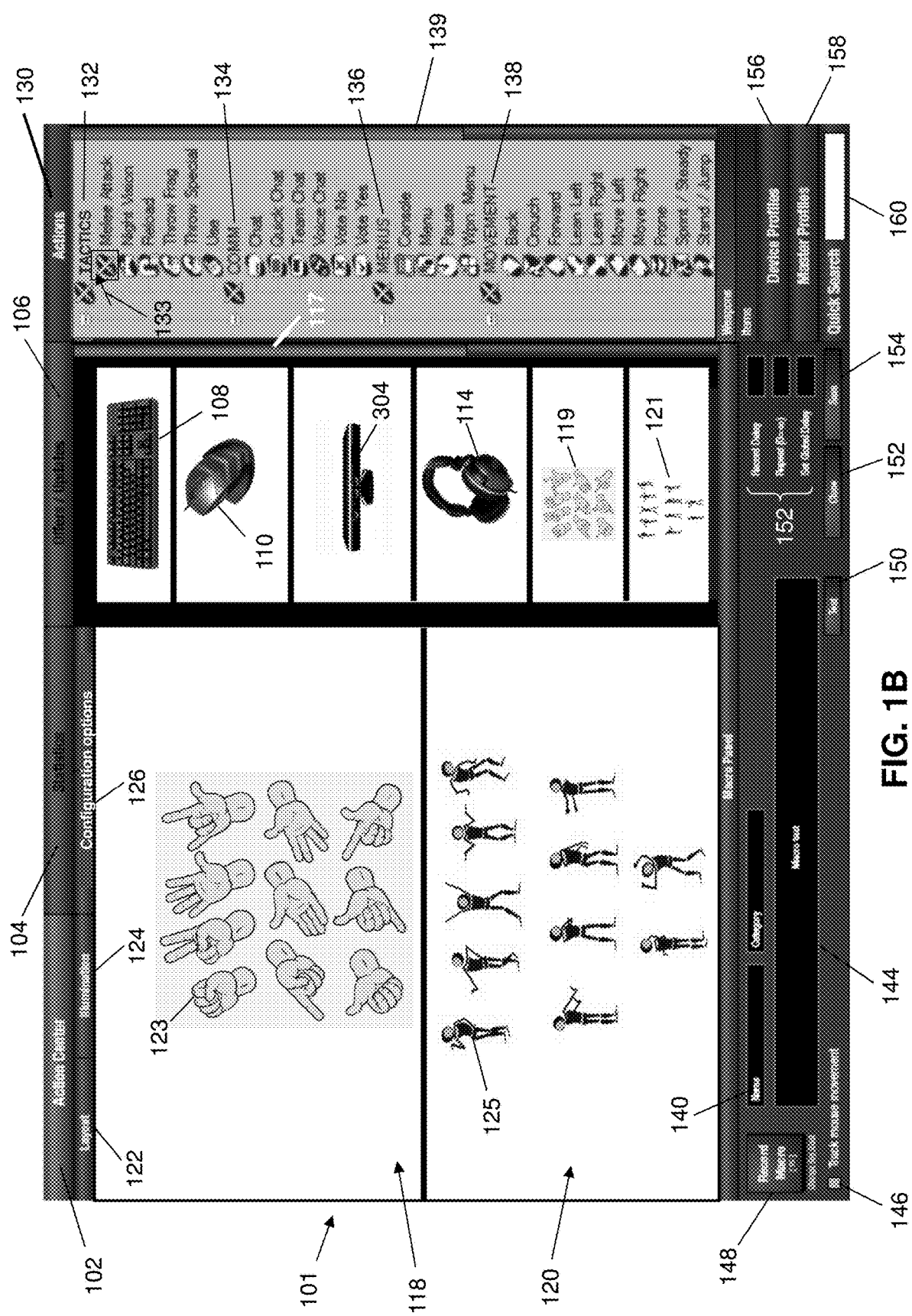

In step 406, the AMS application presents a GUI 101 such as depicted in FIGS. 1A-1B with operationally distinct accessories such as the keyboard 108 and wand 116 (FIG. 1A) and hand gestures 117 and body gestures 119. Each hand gesture 123 can be operationally distinct. Each body gesture 125 can also be operationally distinct. The GUI 101 of FIGS. 1A-1B can present the accessories 108, 116, 119 and 121 in a scrollable section 117. One or more accessories can be selected by a user with a common mouse pointer. In the illustration of FIG. 1A, the keyboard 108 and wand 116 were selected with a mouse pointer for customization. In the illustration of FIG. 1B, the hand gestures 119 and body gestures 121 were selected with a mouse pointer for customization. Upon selecting the keyboard 108 and wand 116, or the hand gestures 119 and body gestures 121 in section 117, the AMS application presents the keyboard 108 and wand 116 or the hand gestures 119 and body gestures 121 in split windows 118, 120, respectively, to help the user during the customization process.

In step 408, the AMS application can be programmed to detect a user-selection of a particular software application such as a game. This step can be the result of the user entering in a Quick Search field 160 the name of a gaming application (e.g., Call of Duty™ or World of Warcraft™). Upon identifying a gaming application, the AMS application can retrieve in step 410 from a remote or local database gaming application actions which can be presented in a scrollable section 139 of the GUI represented as "Actions" 130. The actions can be tactical actions 132, communication actions 134, menu actions 136, and movement actions 138, or any other types of actions, which can be used to invoke and manage features of the gaming application.

The actions presented descriptively in section 130 of the GUI can represent a sequence of accessory input functions which a user can stimulate by button depressions, navigation, hand gestures, body gestures, or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories by way of a simple drag and drop action. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and dragging the symbol to any of the input functions (e.g., buttons) of the keyboard 108 or wand 116, or a select one of the hand gestures 123 or body gestures 125 to make an association with an input function of one of these accessories.

For example, the user can drag the Melee Attack symbol to hand gesture 123 thereby creating an association between the hand gesture 123 and the gaming action of a Melee Attack. When the gamer 302 presents the hand gesture 123 during a game, for example, the AMS application can be adapted to detect the gesture by way of the image sensor 304 as a "trigger" to generate the key sequence "Ctrl A" which is understood by the gaming application as a request for a Melee Attack. In this illustration, the gaming application receives from the AMS application the "Ctrl A" sequence as if it had been generated by a Qwerty keyboard.

With this in mind, attention is directed to step 412 where the AMS application can respond to a user selection of a profile. A profile can be a device profile or master profile invoked by selecting GUI button 156 or 158, each of which can identify the association of actions with input functions of one or more accessories. If a profile selection is detected in step 412, the AMS application can retrieve macro(s) and/or prior associations of actions with the accessories as defined by the profile. The actions and/or macros defined in the profile can also be presented in step 416 by the AMS application in the actions column 130 of the GUI 101 to modify or create new associations.

In step 418, the AMS application can also respond to a user selection to create a macro. A macro in the present context can represent a subset of actions that can be presented in the Actions column 130. Any command which can be recorded by the AMS application can be used to define a macro. A command can represent a sequence of input functions of an accessory, identification of a software application to be initiated by an operating system (OS), or any other recordable stimulus to initiate, control or manipulate software applications. For instance, a macro can represent a user entering the identity of a software application (e.g., instant messaging tool) to be initiated by an OS. A macro can also represent recordable speech delivered by a microphone singly or in combination with a headset for detection by another software application through speech recognition or for delivery of the recorded speech to other parties. In one embodiment a macro can represent recordable navigation of an accessory such as a mouse or joystick, recordable selections of buttons on a keyboard, a mouse, or a mouse pad, and so on. In one embodiment a macro can represent a combination of hand gestures 123 and/or body gestures 125. Macros can also be any combination of the above macro illustrations. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, etc.) and/or by manual entry in field 144 (e.g., typing the name and location of a software application to be initiated by an OS). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to customize such timing. Once the macro has been fully defined, selection of button 154 records the macro in step 420. The recording step can be combined with a step for adding the macro to the associable items Actions column 130, thereby providing the user the means to associate the macro with input functions of the accessories.

Figure 6B:
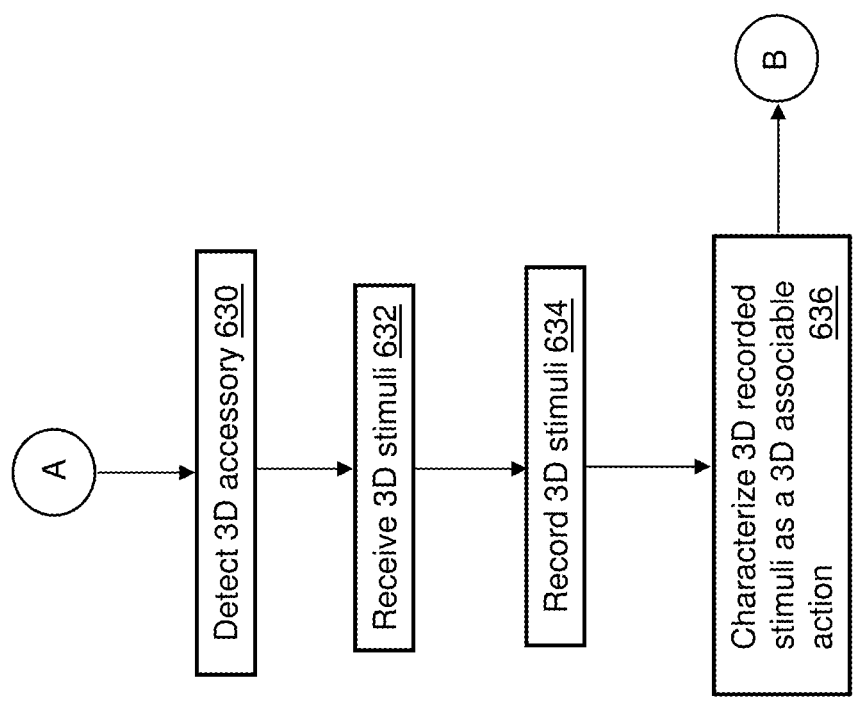

The recording of a macro can take place during a game. Referring to FIG. 6B, the AMS application can be adapted to detect in step 630 a 2D or 3D accessory such as the image sensor 304. In step 632, the AMS application can receive 2D or 3D (e.g., stereoscopic) stimuli in the form of captured images, which can be recorded in step 634. The user can in turn characterize in step 636 by way of a GUI of the AMS application the recorded 2D or 3D stimuli as a 2D or 3D associable action. Utilizing common editing tools, the user can select or crop a portion of 2D or 3D stimuli in the form of hand gestures and/or body gestures, which can amount to a sequence of gaming stimuli (e.g., duck and shoot) which can be used as a macro that can be associated with accessories.

A 2D or 3D macro such as described above can be classified as an action in section 130 and associated with a speech command. Thus when a gamer 302 wishes to cause a duck and shoot action, the gamer 302 can verbally state the action ("Duck and Shoot") without having to perform the hand and/or body gestures captured by the macro. Upon detecting the verbal statement ("Duck and Shoot") the AMS application can generate the stimuli associated with the recorded hand and/or body gestures and submit such stimuli to the gaming software operating in the gaming console or some other gaming device such as a remote server.

In step 422, the AMS application can respond to drag and drop associations between actions and input functions of the keyboard 108 and wand 116, or hand gestures 119 or body gestures 121. If an association is detected, the AMS application can proceed to step 424 where it can determine if a profile has been identified in step 412 to record the association(s) detected. If a profile has been identified, the associations are recorded in said profile in step 426. If a profile was not been identified in step 412, the AMS application can create a profile in step 428 for recording the detected associations. In the same step, the user can name the newly created profile as desired. The newly created profile can also be associated with one or more software applications in step 430 for future reference.

The GUI 101 presented by the AMS application can have other functions. For example, the GUI 101 can provide options for illustrating a layout of the accessory selected (button 122), how the accessory is illuminated when associations between input functions and actions are made (button 134), and configuration options for the accessory (button 126). Configuration options can include operational settings such as Dots Per Inch or Counts Per Inch of a mouse, 2D versus 3D images captured by the image sensor 304, and so on. The AMS application can adapt the GUI 101 to present more than one functional perspective. For instance, by selecting button 102, the AMS application can adapt the GUI 101 to present a means to create macros and associate actions to accessory input functions as depicted in FIGS. 1A-1B. Selecting button 104 can cause the AMS application to adapt the GUI 101 to present statistics in relation to the usage of accessories as depicted in FIGS. 2A-2B. Selecting button 106 can cause the AMS application to adapt the GUI 101 to present promotional offers and software updates.

It should be noted that the steps of method 400 in whole or in part can be repeated until a desirable pattern of associations of actions to input functions of the selected accessories has been accomplished. It would be apparent to an artisan with ordinary skill in the art that there can be numerous other approaches to accomplish similar results. These undisclosed approaches are contemplated by the present disclosure.

FIG. 5 depicts a method 500 in which the AMS application can be programmed to recognize unknown accessories so that method 400 can be applied to them as well. Method 500 can begin with step 502 in which the AMS application detects an unknown accessory such as a new keyboard or image sensor from an unknown vendor by way of a communicative coupling to a computing device from which the AMS application operates. The AMS application in this instance can receive an identity from the keyboard, the image sensor, or an operating system which identifies the unknown accessory to the AMS application. Upon detecting an unknown accessory, the AMS application in step 504 can present a depiction of an accessory of similar or same category in response to a user providing direction as to the type of accessory (by selecting for example a drop-down menu). Alternatively, or in combination with the user instructions, the AMS application can determine from the information received from the unknown accessory an accessory type.

In step 506 the AMS application can receive instructions describing all or a portion of the input functions of the unknown accessory. These instructions can come from a user who defines each input function individually or responds to inquiries provided by the AMS application. The AMS application can for example make an assumption as to the keyboard layout and highlight each key with a proposed function which the user can verify or modify. Once the AMS application has been provided instructions in step 506, the AMS application can create an accessory identity in step 508 which can be defined by the user. In steps 510 and 512, the AMS application can associate and record the accessory instructions with the identity for future recognition of the accessory. In step 514, the AMS application can present a depiction of the new accessory with its identity along with the other selectable accessories in section 117.

Method 500 can provide a means for universal detection and identification of any accessory which can be used to control or manage software applications operating in a computing device. Method 500 can be applied to 2D or 3D accessories such as the wand 116 and the image sensor 304 for capturing hand gestures 119 or body gestures 121 of the gamer 302.

FIG. 6 depicts a method 600 for illustrating the AMS application responding to input function stimuli (triggers) of accessories. Method 600 can begin with step 602 in which the AMS application monitors the use of accessories. This step can represent monitoring the stimulation of input functions of one or more accessories communicatively coupled to a computing device from which the AMS application operates. The input functions can correspond to button depressions on a keyboard, gaming pad, or navigation device such as a mouse. The input functions can also represent navigation instructions such as mouse or joystick movements. The input functions can further represent speech supplied by a microphone singly or in combination with a headset. The input functions can also represent 2D or 3D image stimuli supplied by the image sensor 304 according to the method shown in FIG. 6B. Other existing or future input functions of an accessory detectable by the AMS application are contemplated by the present disclosure. The AMS application can monitor input functions by for example processing human interface device (HID) reports supplied by the accessories to the computing device.

Once one or more stimulations have been detected in step 604, the AMS application can proceed to step 606 to determine if action(s) have been associated with the detected stimulation(s). If for example the stimulations detected correspond to 2D or 3D hand or body gestures, the AMS application can determine if actions have been associated and recorded for such stimulations. If these stimulations "trigger" one or more actions, the AMS application can proceed to step 608 where it retrieves the stimulation definition of these actions for each accessory reporting a stimulation. In step 610, the AMS application can substitute the detected stimulations with the stimulations defined by the action.

To illustrate this substitution, suppose for example that the detected stimulation was a hand gesture 123 in combination with a body gesture 125. Suppose further than an action associated with the stimuli consists of a macro that combines hand gestures 123 with body gestures 125, which results in a request to invoke a voice session with a particular individual using Skype™ and causes a team message to be sent to other players requesting that all players retreat from battle. In step 610, the AMS application would substitute the hand and body gestures 123 and 125 for stimulations that would cause a gaming avatar (animated character of a player) to retreat from a battle scene and a request to invoke a voice session using Skype™. The substitute stimulations would then be reported in step 612 to an operating system (OS).

In step 616, the OS can determine whether to pass the substitute stimulations to an active software application in operation (e.g., a gaming application) and/or to invoke another software application. The active software application can be operating from the same computer system from which the OS and the AMS application operate or can be operating at a remote system such as an on-line remote server 310 or family of servers (e.g., World of Warcraft) awaiting stimulation data from the computer system. In this illustration, the macro comprises both stimulation feedback for the active gaming software application and a request to initiate a voice communication session. Accordingly, the OS conveys in step 618 the stimulation signals to the active gaming software application to retreat the avatar, and contemporaneously invokes the voice session in step 620 with a specific individual (or organization or team).

Referring back to step 606, the illustrations above cover a scenario in which the AMS application has detected an association of actions to accessory stimuli. If however the AMS application does not detect such an association, then the detected stimulus (or stimuli) supplied by one or more accessories is transmitted to the OS in step 614. For example, it may be that a stimulation based on hand or body gestures has no particular association to an action. In this case, the AMS application passes this stimulation to the OS with no substitutes. In step 616 the OS can determine if this stimulation invokes a new software application in step 620 or is conveyed to the previously initiated software application.

The AMS application can also record in step 622 statistics relating to the detected accessory stimulations. A portion of the AMS application can operate as a background process which performs statistical analysis on the stimulations detected. By selecting button 104 in FIG. 1, the AMS application can provide an updated GUI which illustrates the usage of input functions of one or more accessories for which stimulations were detected in step 604. For ease of illustration, the wand, hand gestures and body gestures are shown as groupings 204, 206, and 208. In this illustration, certain accessories that are detected in use are color-coded to illustrate the frequency of usage of these accessories. Accessories not in use are not color coded.

A color scale 203 defines the frequency of usage of the input functions of the accessory. The first end of the scale (navy blue) represents a single detected use of one or more aspects of the accessory, while an opposite end of the scale (bright red) represents 500 detected uses of one or more aspects of the accessory. Based on this scale, the AMS application maps by color in step 624 stimulations of the accessory. For example, the grouping 208 depicts a color coding with a high detectable usage of a body gesture, while grouping 206 illustrates two hand gestures one having a high degree of use, while the other has minimal use. Accessories that have not been used (e.g., grouping 204) are not color coded to readily identify the color mapping of accessories which were used at least once.

The AMS application provides additional functions in a playback panel of the GUI which can help a user understand how the color coded keys were used during an active software application such as a video game. In this section of the GUI, the AMS application can present the user with a playback control function 202 which the user can select to replay, pause, forward or rewind the usage of these keys. When usage playback is selected, the user can for instance see the color coded keys highlighted in real-time with a temporary white border to visualize how the keys were selected. A time clock 204 provides the user the elapsed time of the playback sequence. Button 212 allows the user to retrieve statistics from other sessions, while button 214 provides the user a means to save statistics of a given session.

In addition to a symbolic representation as shown in FIG. 2A, the AMS application can provide the user a means to visualize raw statistics in a table format such as shown in FIG. 2B by selecting button 212. The table format shows raw data in section 232 and possible suggestions in section 234 for improving user performance which can be generated by the AMS application in step 626. Section 232 can be presented in a table format with a column identifying the accessory being analyzed, its usage, and frequency of use. The user can ascertain from this table the most and least frequently used accessories as well as other identifiable patterns.

The AMS application can perform pattern recognition on the accessories to determine ways that might possibly improve the performance of gamer 302. For example, the AMS application can determine from the frequency of hand gesture (HG1) and body gesture (BG6) that these gestures could improve the gamer's performance if they were applied in sequence or alternatively combined as a macro.

The AMS application can utilize present and next generation algorithms to determine how to improve response times and ergonomic usage of accessory devices. The AMS application can for example have at its disposal an understanding of the layout of each accessory, the type of software being controlled by the accessory (e.g., World of Warcraft), the type of operations commonly used to control the software (e.g., 2D or 3D gestures), historical data describing associations made by other garners (perhaps professional garners) to improve performance when controlling the software, and so on. The AMS application can also be adapted to communicate with the gaming software application by way of an Application Programming Interface (API) to receive additional usage statistics from the software which it can in turn use to improve the user's performance. The AMS application can also utilize common statistical and behavior modeling techniques to predict the behavior of the user and responses from the software application to identify possible ways to improve the user's performance.

From the foregoing descriptions, it would be evident to an artisan with ordinary skill in the art that the aforementioned embodiments can be modified, reduced, or enhanced without departing from the scope and spirit of the claims described below. For example, the image sensor 304 can be replaced or combined with other 3D sensing devices. For instance, 3D stimuli can represent 3D coordinate information generated by one or more accelerometers and/or gyroscopes included in an accessory used by the user as a gaming apparatus (see the wand 116 of FIG. 1A). In another embodiment, a gamer can carry accelerometers and/or gyroscopes in one or more locations of the gamer's body or clothing (e.g., clothing outfit for garners with coordinate sensors) to track the gamer's body movements. Other sensors that can detect 3D stimuli of a gamer's movements are contemplated by the present disclosure (e.g., Doppler radar to sense objects on a gamer's body, infrared detectors to sense infrared signals from a gaming accessory carried by the gamer, and so on).

In yet another embodiment, method 400 can be adapted to define more than one programmable layer for an accessory. Such a feature can extend the functionality of an accessory into multi-layer paradigms of input functions. The GUI of FIG. 1 can be adapted so that a user can specify more than one programmable layer for a specific accessory. The user can also specify which layer to present in FIG. 1 while associating actions. If for instance layer 1 is shown, the GUI of FIG. 1 can present the actions associated with this layer by presenting descriptors superimposed on the input functions. When the user switches to layer 2 (e.g., by selecting from a drop-down menu the layer of interest) the accessory can be shown in the GUI with a different set of associated actions. The user can define a macro or identify a key sequence to switch between layers when the accessory is in use.

The trigger for switching between layers can be a toggle function (e.g., selecting the tab key on a Qwerty keyboard, invoking a hand or body gesture, etc.) to switch between layers in a round robin fashion (layer 1→layer 2→layer 3→to layer 1→and so on). Alternatively, the user can define a hold and release trigger to switch between layers. In this embodiment, the user moves to another layer while pressing a button (e.g., a "Shift" key) and returns to the preceding layer upon its release. In one embodiment, hand gestures can be used to identify a desirable layer. In yet another embodiment, the trigger to switch layers can be defined differently per layer. The user can for example select the letter "A" in layer 1 to proceed to layer 2, and select the letter "B" in layer 2 to return to layer 1 or proceed to yet another layer 3. There can be numerous combinations of layers and triggers which can be defined to substantially expand the capability of single accessory. Additionally, triggers can be of any kind, tactile, speech, 2D or 3D images, etc.

In another embodiment, method 400 can be adapted so that a user can define super macros and/or super profiles. A super macro can represent nested macros (combinations of macros). Method 400 can be adapted so that the user can customize the timing for executing nested macros. Similarly, a super profile can represent nested profiles (combinations of profiles). A super profile can for example comprise sub-profiles, each sub-profile defining associations of actions to input functions of a particular accessory.

In yet another embodiment, method 400 can be adapted to establish audio profiles for headset accessories. When a user selects a headset accessory such as 114, GUI 101 can be adapted to provide the user options to establish a sound output (equalizer) setting to optimize performance for a particular gaming application. For instance GUI 101 can present an equalizer so that the user can raise the volume of high frequencies to an enemy's footsteps from a longer distance in a gaming application.

The methods illustrated in FIGS. 4-6 can also be adapted for non-gaming applications. For instance, the methods disclosed herein can be adapted for office applications such as editing and email where macros may be useful. Similarly, the methods disclosed herein may be useful in financial services applications where rapid communications can improve the profitability of a transaction such as a stock, or commodity transaction.

The foregoing embodiments are a subset of possible embodiments contemplated by the present disclosure. Other suitable modifications can be applied to the present disclosure. Accordingly, the reader is directed to the claims for a fuller understanding of the breadth and scope of the present disclosure.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium comprising executable instructions that, when executed by a processing system including a processor, facilitate performance of operations, the operations comprising:
   characterizing three-dimensional (3D) stimuli as a 3D associable action, the 3D stimuli comprising a sequence of 3D navigational movements;
   presenting, in a graphical user interface, the 3D associable action in a graphically identifiable form along with a plurality of gaming accessories having distinct operational functions;
   detecting an association of the 3D associable action with an input function of a selected gaming accessory of the plurality of gaming accessories; and
   storing the association of the 3D associable action and the input function in a profile.

2. The non-transitory machine-readable storage medium of claim 1, wherein the operations further comprise:
   detecting a stimulation of the input function while monitoring usage of the selected gaming accessory resulting in a detected stimulation;
   retrieving, from storage, the 3D stimuli responsive to the detected stimulation of the input function, resulting in retrieved 3D stimuli; and
   transmitting the retrieved 3D stimuli destined for a software gaming application to control a 3D aspect of a presentation generated by the software gaming application.

3. The non-transitory machine-readable storage medium of claim 2, wherein the 3D stimuli are generated by a 3D gaming accessory, wherein the 3D gaming accessory comprises a sensor for capturing 3D images, and wherein the software gaming application operates from a gaming console or an online gaming system.

4. The non-transitory machine-readable storage medium of claim 2, wherein the transmitting the retrieved 3D stimuli destined for the software gaming application comprises transmitting the retrieved 3D stimuli to an operating system, wherein the operating system is adapted to transmit the 3D associable action or a first aspect thereof destined for the software gaming application.

5. The non-transitory machine-readable storage medium of claim 4, wherein the operating system is adapted to launch a software application responsive to the retrieved 3D stimuli or a second aspect thereof.

6. The non-transitory machine-readable storage medium of claim 1, wherein the operations further comprise recording statistics associated with the selected gaming accessory.

7. The non-transitory machine-readable storage medium of claim 1, wherein the non-transitory machine-readable storage medium is readable by a desktop computer, a laptop computer, a server, a mainframe computer, or a gaming console.

8. The non-transitory machine-readable storage medium of claim 1, wherein the operations further comprise:
   receiving the 3D stimuli from a 3D gaming accessory while in use; and
   storing the 3D stimuli from the 3D gaming accessory, resulting in 3D recorded stimuli.

9. The non-transitory machine-readable storage medium of claim 8, wherein the operations further comprise:
   associating the 3D recorded stimuli with a macro; and
   characterizing the macro as the 3D associable action.

10. A method, comprising:
    detecting, by a processing system including a processor, an association of a three-dimensional (3D) associable action with an input function of a selected gaming accessory of a plurality of gaming accessories;
    detecting, by the processing system, a stimulation of the input function while monitoring usage of the selected gaming accessory resulting in a detected stimulation;
    retrieving, by the processing system, a 3D recorded stimuli responsive to the detected stimulation of the input function, the 3D recorded stimuli comprising a sequence of 3D navigational movements; and
    transmitting, by the processing system, the 3D recorded stimuli destined for a software gaming application to control a 3D aspect of a presentation generated by the software gaming application.

11. The method of claim 10, further comprising:
    recording, by the processing system, statistics associated with the selected gaming accessory;
    characterizing, by the processing system, the 3D recorded stimuli as the 3D associable action; and
    presenting by the processing system, in a graphical user interface, the 3D associable action in a graphically identifiable form along with the plurality of gaming accessories having distinct operational functions.

12. The method of claim 10, further comprising storing, by the processing system, the association of the 3D associable action and the input function in a profile.

13. The method of claim 10, further comprising combining, by the processing system, a profile with another profile.

14. The method of claim 10, further comprising recording, by the processing system, timing characteristics of the 3D recorded stimuli.

15. The method of claim 14, further comprising modifying, by the processing system, at least a portion of the timing characteristics according to user provided instructions resulting in modified timing characteristics.

16. The method of claim 10, wherein the 3D recorded stimuli have been generated by a 3D gaming accessory, and wherein the 3D gaming accessory comprises a sensor for capturing 3D images.

17. A computing device, comprising:
    a processing system including a processor; and
    a memory that stores executable instructions that, when executed by the processing system, facilitate performance of operations, the operations comprising:

receiving three-dimensional (3D) stimuli from a 3D gaming accessory while in use, the 3D stimuli being generated by the 3D gaming accessory, the 3D stimuli comprising a sequence of 3D navigational movements, and the 3D gaming accessory comprising a sensor for capturing 3D images;

associating the 3D stimuli with a macro; and characterizing the macro as a 3D associable action.

18. The computing device of claim 17, wherein the operations further comprise:

detecting the 3D gaming accessory; and recording statistics associated with the 3D gaming accessory.

19. The computing device of claim 17, wherein a software gaming application receives the 3D stimuli from the 3D gaming accessory and the software gaming application operates from a gaming console or an online gaming system.

20. The computing device of claim 17, wherein the operations further comprise:

recording timing characteristics of the 3D stimuli;

modifying at least a first portion of the timing characteristics according to user provided instructions resulting in modified timing characteristics; and generating 3D recorded stimuli according to at least a second portion of the modified timing characteristics.

* * * * *